J. URMY.
Grain Drill.

No. 8,866.

2 Sheets—Sheet 1.

Patented Apr. 6, 1852.

J. URMY.
Grain Drill.
No. 8,866.
2 Sheets—Sheet 2.
Patented Apr. 6, 1852.
Fig. 9.
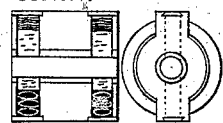
Fig. 5.
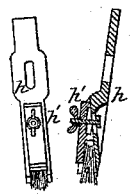
Fig. 4.
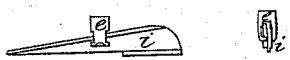
Fig. 6.
Fig. 7.
Fig. 8.
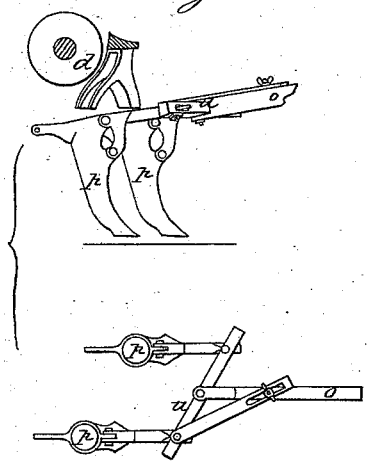
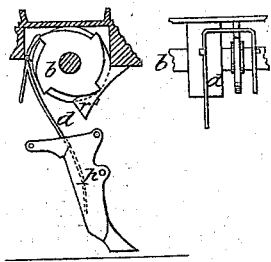
Fig. 3.
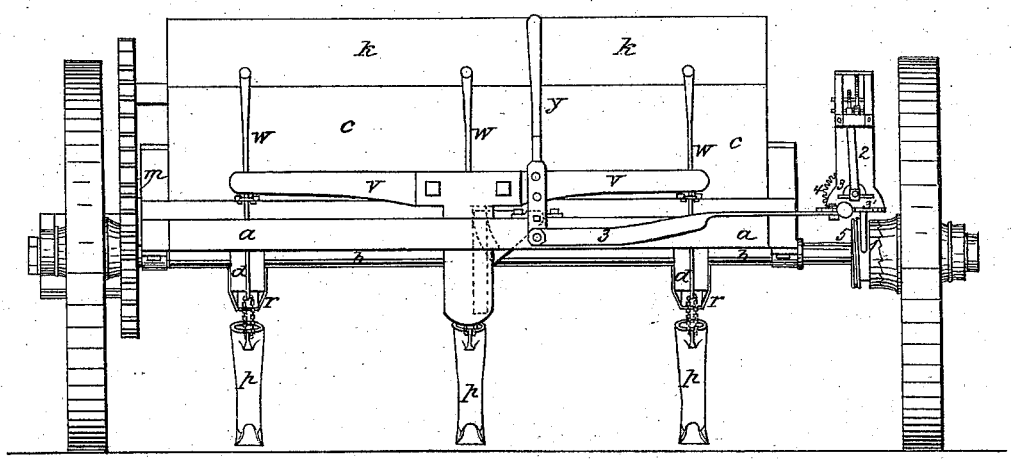

UNITED STATES PATENT OFFICE.

JESSE URMY, OF WILMINGTON, DELAWARE.

IMPROVEMENT IN SEED-PLANTERS.

Specification forming part of Letters Patent No. 8,866, dated April 6, 1852.

*To all whom it may concern:*

Be it known that I, JESSE URMY, of Wilmington, in the county of New Castle and State of Delaware, have invented certain new and useful Improvements in Seed-Planters; and I do hereby declare that the following is a full, clear, and exact description of the principle or character which distinguishes them from all other things before known, and of the usual manner of making, modifying, and using the same, reference being had to the accompanying drawings, in which—

Figure 2:
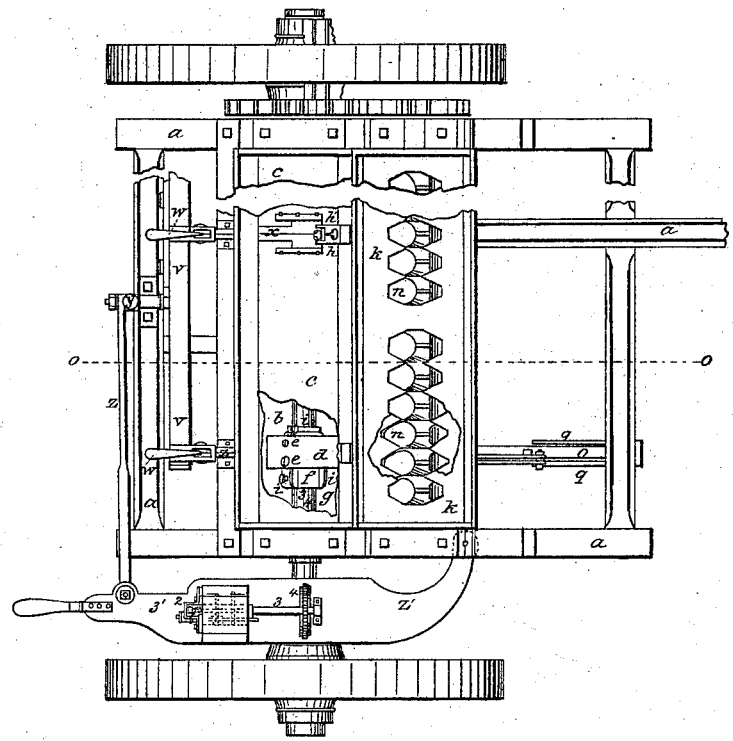
Figure 1:
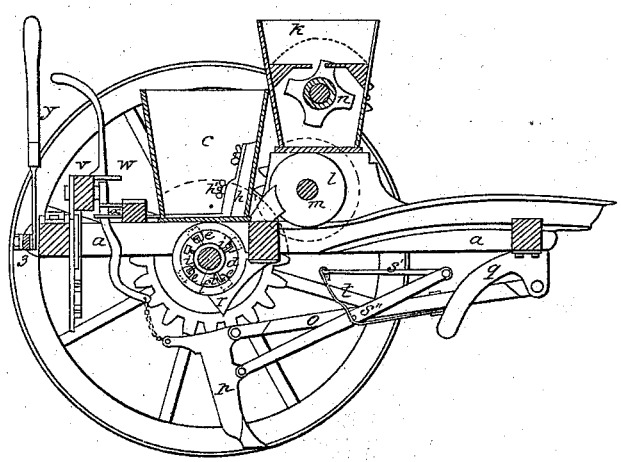

Figure 1 is a section; Fig. 2, plan; Fig. 3, rear elevation. The other figures are detached portions.

My improvements consist in the construction and arrangements of certain parts of the seed-planter by which its action is rendered more certain, efficient, and convenient than any with which I am acquainted.

The frame is an oblong rectangular figure, $a$, supported upon two wheels, the axis $b$ of which can be either attached or detached at pleasure, so as to revolve with them or not. Directly above the axis is a hopper, $c$, for containing the grain to be planted, with holes through the bottom for the grain to descend through. Upon the axis $b$ are small wheels or short rollers $d$, as many in number as is required, depending upon the size of the machine. In the peripheries of these rollers $d$ are holes or recesses, into which the grain is received as it revolves under the opening in the hopper. The depth of each of these holes is determined by a pin, $e$, that exactly fits it, and can be sunk as far below the surface as is desirable. Into the shank of each of these pins a wedge, $i$, is inserted, so that by moving it forward or back the pin is thrust out or drawn in. (One of these pins and wedges is shown at Fig. 4.) All the wedges are connected with a collar, $f$, which surrounds the axle, so as all to be moved out or in at pleasure, regulating all alike, and governed by an index on the axle at $g$, Fig. 2, and confined by a set-screw on the axle. This I call a "finger-registers." It is obvious that large or small holes can be made in the roller, to sow large or small seeds, and with one or the other shut off at will, as shown in the drawings.

I attach to the front of the hopper, at each opening in the bottom, an iron socket, $h$, so that it can be raised up or lowered. This socket contains a quantity of bristles, which are firmly secured by the set-screws $h'$. This is shown in an enlarged view, Fig. 5, and is a very important arrangement for determining the quantity of grain dropped. The bristles, by this contrivance, are easily thrust forward when worn off, and can be renewed when entirely worn out.

To the front of the grain-hopper another hopper, $k$, is affixed, intended to contain guano or other manure. The bottom of this hopper is made close, and the front is hinged at its lower part, so that it can be opened the whole length. The bottom has holes in it for feeding into rollers $l$ on a shaft, $m$, geared to the axis $b$, on which the wheels are, and turning in an opposite direction. Within the hopper there is a pulverizer, $n$, composed of an axis having upon it projecting teeth, and above this is a false bottom with openings in it, through which the teeth of the pulverizer pass up into the material above, break any lumps found therein, and bring it down to the lower compartment, when it may be carried by means of the rollers into the same spot as the seed, or scattered broadcast by the open door in front. To the front bar of the frame the beams $o$ of the teeth $p$ are jointed. These extend back in an inclined position, having two cast-iron projections, $q$, from the beam, one on each side of them, to steady them as they are permitted to rise and fall in working. The teeth are made hollow, and are affixed to the beam in a way to be presently described. The seed, &c., drops from the rollers $r$ into a directing-spout, $r'$, below, and thence through the hollow teeth to the furrow.

The tooth is affixed to the beam by a pin, so that its point can turn back. From its front projects up a brace, $s$, and has an eccentric, as shown at Fig. 6, so that by turning it more or less the pitch of the tooth can be changed for different work.

To prevent injury to the tooth in striking a stone various devices have been resorted to, the most common of which is to insert a weak pin into the brace, which will break when the tooth meets with an impediment that would injure it, and by this means the tooth is saved; but it will be obvious that this would require frequent although simple repair. To obviate the necessity of this I so arrange a spring and combine with it a brace that it can bear with greatest force at the point of rest; but when the tooth is drawn back with great force it yields, tipping readily, and the tooth will then be easily pushed back into place again. The lever extends up above the beam, as clearly shown in Fig. 1, and from its front end a rod, $s'$, extends back to the extreme end of a spring, $t$, which is attached by its opposite end to the beam, and thence passes under a pin, $s''$, on the brace, and extends up nearly at a right angle to the rod, a little crook being made just at the pin, into which it fits. By this fixture the tooth will require considerable force applied to it to draw the pin out of the recess, after which it falls back easily into place.

In ribbing ground, when a great number of teeth are required, I insert a short cross-bar, $u$, into the end of the beam, to either end of which I affix a tooth by a joint, the bar itself being so attached to the beam as to swivel and be set at any angle, as clearly shown at Fig. 7. A bifurcated spout or conductor leads from the hopper to this apparatus, which can also be swiveled to suit the position of the hollow teeth. Each of the teeth are attached to a curved handle, $w$, that stands up behind the seed-hopper, and is made to be drawn up to raise the tooth to which it is attached, a small hook on it holding it in place; or they can all be raised at once by a bar, $v$, to be presently described. Each of the levers or handles works forward a slide, $x$, in the bottom of the hopper to cover the opening opposite when it is raised, and draws it back as it lowers again, so that when any one or all the teeth are raised the openings thereto from the hopper are closed, and when lowered they are opened, ready to drop the seed.

The bar $v$ is connected with a lever, $y$, attached to the frame of the machine, by which it can be raised and lowered. A connecting-rod, $z$, connects this lever with another horizontal one, $z'$, that projects forward, and is attached with the coupling 1, that connects the axle with the wheel. This lever is made broad, and upon it is a counter to measure the quantity of ground seeded. This apparatus is shown in Fig. 3, and consists of clock-work impelled by a ratchet-wheel acted on by a pawl, 2, that moves up and down by means of its connection with a small crank attached to the end of a horizontal axis, 3, carrying a toothed worm-wheel, 4, that works into a worm or endless thread, 5, on the clutch above named. By this it will be seen that by the single movement of lever $y$ or $z'$ the seeding parts register, and other operative parts are at once thrown out of gear and stopped; or any one of the teeth can be drawn up at a time, which is very necessary on pointed land.

The hub of my wheel, which turns loose on the axle, I have cast or formed with a recess in it, as shown in Fig. 9, into which I insert a piece of bacon-fat, that I find to be the best lubricator, and the mode of using it to be the most efficient. On the bacon I place a set of curved springs, $s$, fitting each other, by which the bacon is pressed down, and as it wears the springs are turned so as to present their curved surfaces opposed. The two positions of the springs are shown in Fig. 9.

Having thus fully described my improved machinery for seeding, what I claim therein, and desire to secure by Letters Patent, is—

1. The jointed teeth attached to the beam, as shown in Fig. 7, in combination with the swiveling bifurcated spout to direct the corn, as above specified, for ribbed seeding.

2. The combination and arrangement of the counter 2 with the clutch, as described, so that the counting shall stop when the seed is not delivered.

3. The finger-register $f\,i$ and its appurtenances, as above described, for regulating the quantity of seed delivered.

4. In combination with the seeding apparatus, the pulverizer for guano, &c., constructed and arranged as set forth.

JESSE URMY.

Witnesses:
LEONARD WALTER,
JACOB SHOWALTE.